F. MEINE.
APPARATUS FOR ASCERTAINING STRIKE AND DIP OF VEINS OR SEAMS IN BORE HOLES.
APPLICATION FILED JULY 25, 1903.
908,299.  Patented Dec. 29, 1908.
4 SHEETS—SHEET 1.
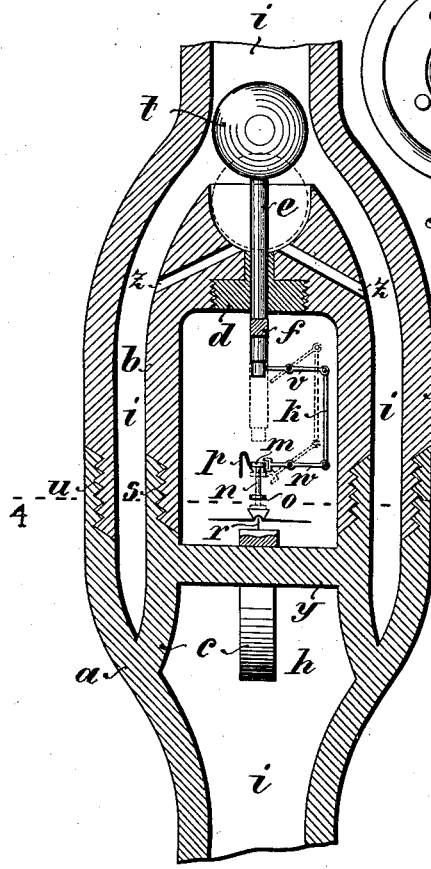
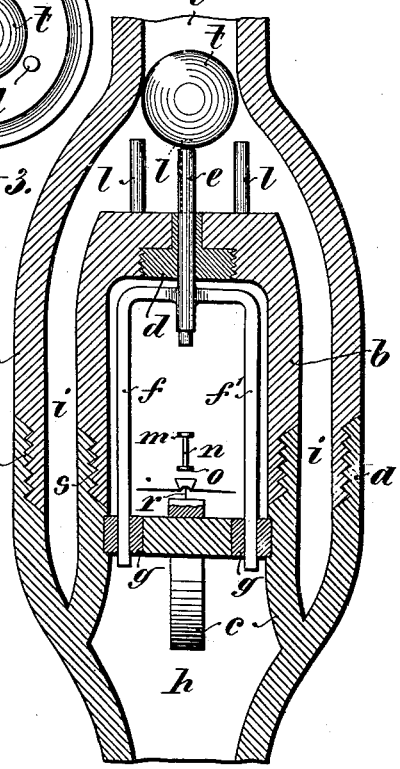
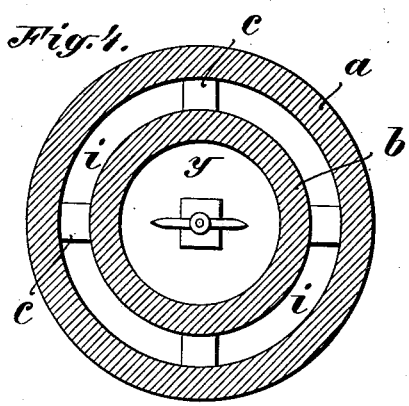

F. MEINE.
APPARATUS FOR ASCERTAINING STRIKE AND DIP OF VEINS OR SEAMS IN BORE HOLES.
APPLICATION FILED JULY 25, 1903.
908,299.
Patented Dec. 29, 1908.
4 SHEETS—SHEET 2.
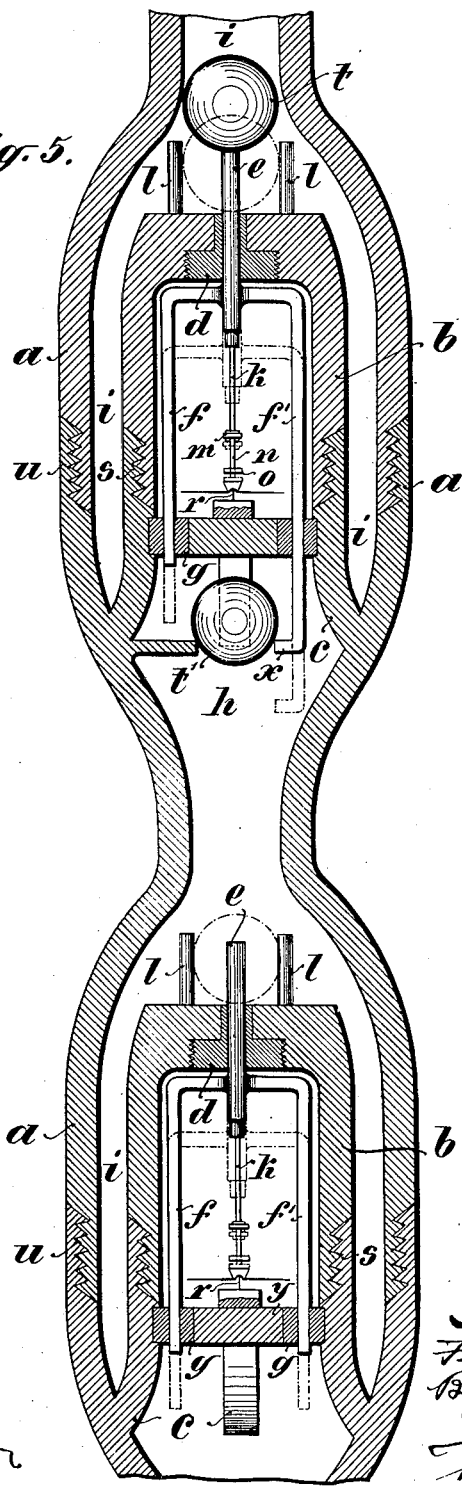

F. MEINE.
APPARATUS FOR ASCERTAINING STRIKE AND DIP OF VEINS OR SEAMS IN BORE HOLES.
APPLICATION FILED JULY 25, 1903.
Patented Dec. 29, 1908.
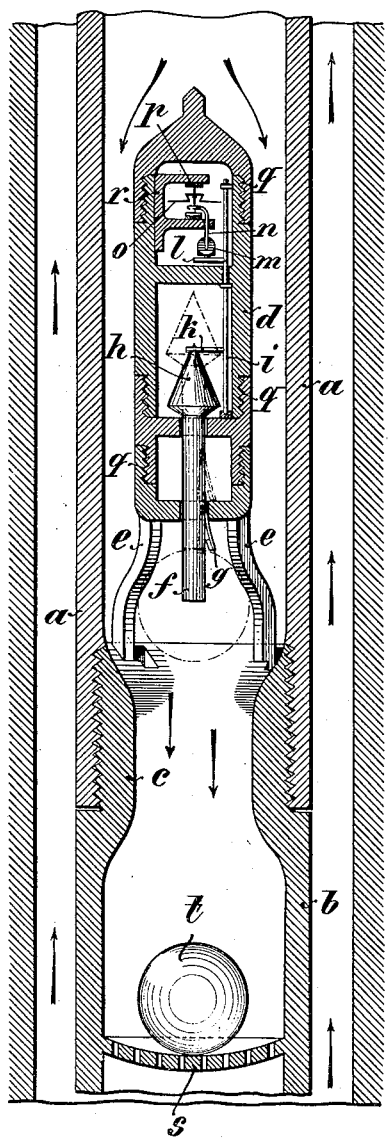
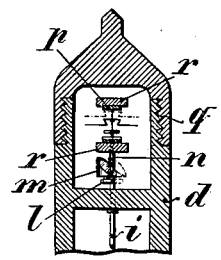
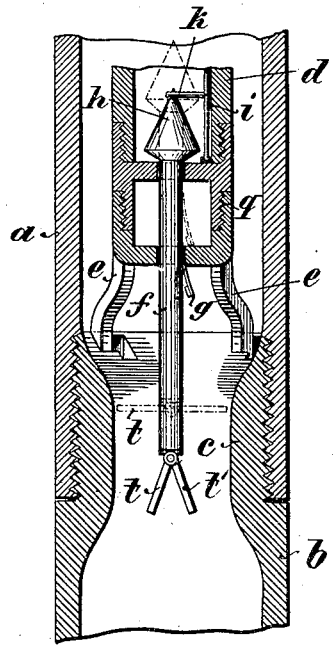

F. MEINE.
APPARATUS FOR ASCERTAINING STRIKE AND DIP OF VEINS OR SEAMS IN BORE HOLES.
APPLICATION FILED JULY 25, 1903.
908,299.
Patented Dec. 29, 1908.
4 SHEETS—SHEET 4.
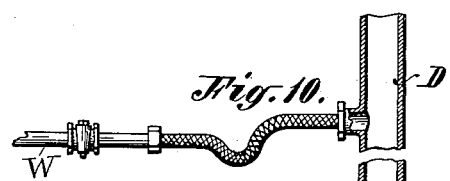
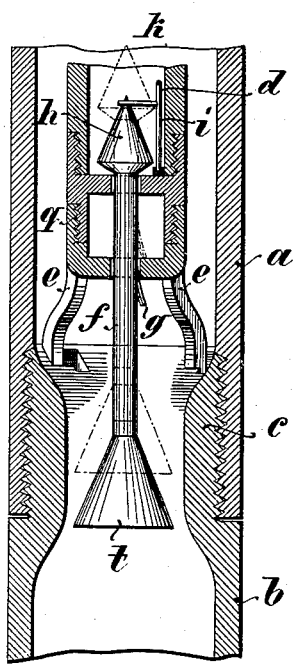
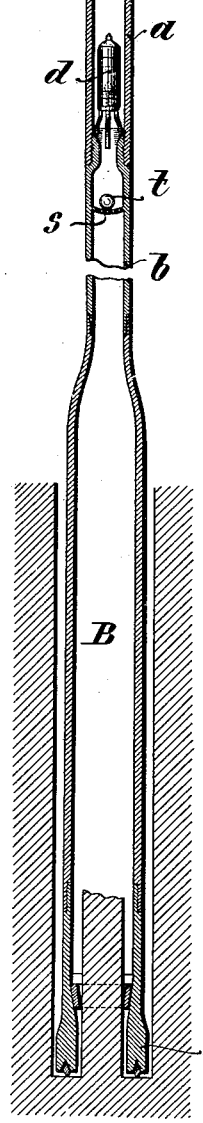

UNITED STATES PATENT OFFICE.

FRANZ MEINE, OF BERLIN, GERMANY.

APPARATUS FOR ASCERTAINING STRIKE AND DIP OF VEINS OR SEAMS IN BORE-HOLES.

No. 908,299.  Specification of Letters Patent.  Patented Dec. 29, 1908.

Application filed July 25, 1903. Serial No. 167,057.

*To all whom it may concern:*

Be it known that I, FRANZ MEINE, doctor of philosophy and mining engineer, a subject of the King of Prussia, and residing in Berlin N, Pritzwalkerstrasse No. 1, Prussia, German Empire, have invented new and useful Improvements in Apparatus for Ascertaining Strike and Dip of Veins or Seams in Bore-Holes, of which the following is a specification.

This invention relates to an apparatus for ascertaining strike, dip and direction of veins or seams in bore-holes and is intended to improve and to simplify the methods of ascertaining strike and dip by means of a magnetic needle at present in use. The latter was first applied for this purpose by Köbrich, whose method has, however, the drawback, that the magnetic needle after it is fixed, is not rigidly connected to the core. An improvement on Köbrich's apparatus is a device in which a clock-work mechanism is placed in a closed casing in the core tube or tubular borer, said clock-work mechanism fixing the needle at a given time. Compared with Köbrich's apparatus, this apparatus has the advantage that the magnetic needle always remains secured to the core, even when the latter is removed from the bore-hole and enables the strike and dip of lodes or seams to be ascertained on the surface of the ground in a reliable manner, though this necessitates a complicated proceeding and special arrangement of marks on the bore rods. As the core, while being withdrawn, naturally turns together with the rods, it is of the utmost importance for the purpose of ascertaining the strike and dip, that the needle should be fixed in that natural north direction which it occupied at the end of the boring. The use of clock-work suffers, however, from the drawback that water or mud penetrating into it, easily damage it and make necessary repairs which cannot be executed on the spot, and in most cases can only be executed by the manufacturers of the mechanism. This, of course, takes up a great deal of time and is very expensive, and makes it difficult to use the apparatus abroad. The use of clock-work makes it further necessary to have pipes of a certain diameter, since the smallest clock-work has a radius of about 28 mm., so that the case must be 76 mm. outside diameter and the bore-hole at least 80 mm. diameter. But at the present time there are bore holes of 50 mm., and less, diameter.

A serious drawback of clock-work is that it makes the boring operation tied to a certain time. The fixing device is connected to the clock-work in such manner that it becomes operative at a certain definite moment. If, for instance, it is assumed that the work begins at 6 o'clock, and that, after allowing two hours for putting in the bore rods, the necessary boring core is bored out in about 6 hours, then the clock-work should be set for 2.15 p. m., and the boring stopped at 2 o'clock, so that the apparatus may stop before it is fixed. If the duration of boring has been under-estimated or if it has been delayed by some accident, then the whole work has been done in vain, and the boring must begin afresh, as the fixing device will become operative at 2.15 without the desired core having been obtained. If, on the contrary, the necessary depth has been reached before, or if for some technical consideration (for instance on account of meeting sharp rock that might damage the diamond crown) it is found necessary to stop boring or to exchange the crown, then the boring operation must be stopped for a long time. These drawbacks are obviated by the apparatus according to this invention, in which clock-work mechanism is obviated. The latter is replaced by a mechanical device, such as, for instance, a series of levers, which is operated at any desired moment from the outside, say by throwing into the tubular bore rods a ball, or the like, and fixes the needle. When the needle has been fixed, the bore rods are withdrawn to the surface, the bored-out core remaining secured to the needle. The position of the fixed needle is then marked at the bottom of the core in a very simple manner, and in this way the direction of the lode in question determined.

An apparatus according to this invention is illustrated, by way of example, in the accompanying drawings, of which—

Figure 1 represents a longitudinal section of the apparatus, Fig. 2 a longitudinal section of a modified construction, Fig. 3 a plan of the upper part of the inner casing of the apparatus shown in Fig. 2, Fig. 4 a cross section on line 4—4 through the apparatus shown in Fig. 1, Fig. 5 a longitudinal section of the lower part of the apparatus when used in combination with a second apparatus, Fig. 6 a longitudinal section of another modified construction, Fig. 7 a longitudinal section of the space within which is disposed the magnetic needle, Figs. 8 and 9 modified constructions of the apparatus, Fig. 10 a longitudinal section through the bore rod.

The device consists of an outer casing $a$ (Figs. 1 and 4) which may be constituted by an extension of the boring rod or by a special shaping of the upper portion of the tubular borer. In the casing $a$ is another casing $b$, rigidly connected to the first by means of four feet $c$, and both are made of delta metal, phosphorous bronze or some other non-magnetic material. The outer casing can be unscrewed at $u$, the inner one at $s$. At the top of the casing $b$ is a pin $e$ passing through a stuffing box $d$ preventing water from entering the inner casing $b$. The casing $b$ is provided at the point where the pin $e$ passes through it, with a semi-spherical recess, from which sand and clay particles coming in with the flushing water, are drained off through passages $z$. Instead of being provided with a recess for the ball, the upper surface of the casing $b$ could be made flat and provided with three pins $l$ (Figs. 2 and 3), between which the ball would fall. In this way the settling of sand and the like would be prevented. The pin $e$ is provided with two square extensions $f\,f'$, the lower ends of which pass through stuffing boxes $g$ through the bottom plate $y$ of the inner casing $b$, into the hollow chamber $h$. These projections are intended to prevent the pin $e$ from sinking as there is exactly the same pressure acting on them from below as on the pin $e$ from the top. The chamber $h$ is connected with water ways $i$ through which the necessary flushing water is supplied through main $w$ to the boring point through the bore rods, which, in the case of most pumps, is effected at a pressure of about 15 atmospheres. The pin $e$ is connected to the magnetic needle by means of some suitable mechanical device, such as, for instance, a suitable series of levers. In the example shown in the drawing, two double levers are used connected by a vertical rod $k$. The first double armed lever $v$ is arranged so that the pin $e$, in descending, depresses its inner end, thus raising the outer one. The connecting rod $k$ is moved, and the bifurcated end of the lever $w$ depresses a plate $m$. This plate is mounted on a pin $n$ provided at the bottom with a leather disk $o$. As soon as the plate $m$ is moved downwards, a spring $p$ presses against it and prevents it from rising again. The leather ring $o$ engages then with roughened or corrugated surface (not shown in the drawing) of the compass needle head and thus fixes the needle, pivoted on the point $r$, in its natural northerly direction. The raising of the bore rods can then be proceeded with.

The fixing of the magnetic needle is effected by a ball $t$ thrown into the bore rods. This ball gradually sinks, but at first it has not sufficient force to depress the pin $e$. The ball has nearly the same diameter as the bore rods, and therefore stops the flow of the water. When, after the ball has been thrown in, the flushing water pump is started again, the increased pressure thus produced forces the ball against the pin $e$, the latter is depressed and fixes the needle. Thereupon water, which, owing to its passage having been closed by the ball, had for a moment an increased pressure, circulates again with the ordinary pressure, as may be seen at the pressure gage of the pump. The bore rods and the bored-out core are then at once withdrawn to the surface. After having unscrewed the casings $a$ and $b$, the needle rigidly connected to the bored-out core will easily show in which direction the lodes dip and strike. The manner of fixing the direction of dip and strike of the lodes will be more fully explained hereinafter.

A second apparatus may be inserted into the bore rods, in order to have a check on the indications of the first one, which is of importance when the upper apparatus is arranged in the tubular portion of the bore hole, and the lower about 5–15 meters below, in the untubed portion, for instance in executing preliminary work for a freezing tube. The upper apparatus is operated in the usual manner from the outside. At the lower end of the extension arms $f\,f$ is a projection $x$. As soon as the ball has produced a downward movement of the lever device, the projection $x$ also falls and releases a second ball $t^1$ for the lower apparatus allowing it to fall (Fig. 5). If in this case both the needles—the upper one as well as the lower one—indicate in the same direction, then it is safe to assume that the apparatus is working correctly and that the needles show accurately the northern direction. If however one of them indicates a different direction from the other, then this is a sign that in one apparatus the metallic tubing of the bore hole, and in a freezing tube the iron mass has exercised a deflecting power over the needle. The pin $e$ could also be made to project from below into the casing $b$. The ball is then arranged permanently on a grating, or the like, below the bore tube, and is not thrown into the bore rods at the end of boring. The working of this arrangement is as follows: During regular boring, the so-called direct flushing is used, that is to say water is pumped into the bore pipes and rises to the surface between the bore rods and the walls of the bore hole or lining tube. When it is desired to fix the magnetic needle, the rotation (working of the boring instrument) is stopped, so as to enable the needle to come to rest. Then, in order to prevent collection of sludge at the lower end of the bore hole, the flushing is still continued for a little while. Then, by means of a three way cock, direct circulation is replaced by an indirect one, and flushing water pumped in through the lining pipes rises to the ground through the bore rods (that is to say following the opposite path to the first case). The ball is thus raised and brought into a narrow passage in which it strikes the pin f. It then obstructs the passage of the water at this spot, the pressure rises and the pin is pushed into the casing b where it affects in a suitable manner the fixing of the magnetic needle. Figs. 6 and 7 show a modified construction of the apparatus according to this invention for carrying this into effect.

In the portion b' of the bore rod is arranged a grating s on which rests the ball t. The cross-section of the pipe is reduced at c and the pipe is screwed to the pipe a, so that both pipes can be unscrewed. The casing d containing the magnetic needle and the device for fixing it, is secured to the pipe b' by means of legs e. Under this casing is arranged a pin f provided at the top with a conical projection h. Against the point of that cone h rests a lever k mounted on a rod i rotatable about its longitudinal axis. Another lever l is arranged on the rod i in a direction parallel to the lever k and provided with a projection m with a cam surface for the pin n. At the top of the casing d is a double armed frame r in which is arranged the magnetic needle o. In order to prevent water from coming into the space intended to receive the needle, the casing d is provided with horizontal divisions. The rod i passes through a stuffing box. When now, owing to the indirect circulation, the ball t (as already stated) is driven upwards, it strikes the lower end of the pin f and forces it up. When the pin f is forced upwards, its conical projection h forces the arm k and thus forces the rod i which cannot rise, to turn. The arm l and the cam projection m (Fig. 7) are then also turned, and the lever n forced upwards and forces the magnetic needle against the disk p. (This position is shown dotted in Fig. 7). The needle is thus fixed in a very simple manner. In order to prevent the pin f from moving back from the position in which it holds the needle fixed, it is provided with a spring projection g coming to lie against the horizontal wall of the casing. The latter can be removed owing to the arrangement of screw-thread q or some other arrangement.

Instead of a ball and pin, a pin with two flaps t' t' (Fig. 8) could be used, which act in the same way as the ball, both flaps depending vertically downwards during direct circulation and coming into horizontal position during the indirect circulation, thus presenting to the flushing current a large surface.

Instead of flaps, a hollow cone t open at the bottom could be used (Fig. 9). During direct circulation, water could strike the surface of the cone at a sharp angle, while during the reversed circulation it would enter its open wide bottom and force it upwards.

The whole arrangement and the whole process of working are as follows: Above the diamond crown A is arranged a tubular borer B about 5 cm. long (Fig. 10) to which is connected a pipe b' made of phosphorous bronze or some other non-magnetic metal. In this pipe is arranged, say, a grating s on which rests a ball t. Over that is arranged a tubular boring rod a of the same material, containing the apparatus proper with the magnetic needle. Then the ordinary iron bore rods D are connected to the surface of the ground. After the needle has been fixed by means of some of the fixing devices described and the circulation of water stopped, the bore rods can be pulled up. The breaking off of a core from solid rock can be effected by means of a special ring sliding down in the diamond crown provided with a conical recess. When the bore rods are pulled up, this ring contracts and breaks off the core from the rock.

When the whole boring apparatus has been pulled up, the upper portions, including the rod a, are unscrewed so that the magnetic needle connected by its casing with the core, is uncovered, and then the lower portion (the rod b with the apparatus and tubular borer together with the crown and the core) is laid on the ground. The whole is turned on the ground until the fixed magnetic needle comes into a vertical position. Then a vertical line is drawn on the end of the core opposite the needle, the core still remaining in the crown; or the position of the needle marked in some other way. When the core is taken out, it is sufficient to place it with the place marked on a N. S. line marked on the ground, and then the layers of the core are in exactly the same position as regards their direction, as they were in the bore-hole.

What I claim and desire to secure by Letters Patent of the United States is:—

1. In an apparatus for ascertaining the strike or dip of veins or seams in bore-holes, the combination with a tubular boring rod adapted to conduct flushing water, means for supplying water to said rod, a casing containing a suitably mounted magnet needle, means adapted to fix the said needle at any desired time and any desired distance below the ground independently of the time consumed for lowering said boring rod, said fixing means being normally inoperative, of means operated by said flushing water adapted to cause said fixing means to operate.

2. In an apparatus for ascertaining the strike or dip of veins or seams in bore-holes, the combination with a tubular boring rod adapted to conduct flushing water, means for supplying water to said rod, an outer casing containing an inner waterproof casing, said inner waterproof casing containing a suitably mounted magnet needle, and means adapted to fix said needle at any desired time and any desired distance below the ground independently of the time consumed for lowering said boring rod, said fixing means being normally inoperative, of means operated by said flushing water adapted to cause said fixing means to operate.

3. In an apparatus for ascertaining the strike or dip of veins or seams in bore-holes, the combination with a tubular boring rod adapted to conduct flushing water, means for supplying water to said rod, an outer casing containing an inner waterproof casing, said inner waterproof casing containing a suitably mounted magnet needle, and a lever mechanism adapted to fix said needle at any desired time and any desired distance below the ground independently of the time consumed for lowering said boring rod, said lever mechanism being normally inoperative, of means operated by said flushing water adapted to cause said lever mechanism to operate.

4. In an apparatus for ascertaining the strike or dip of veins or seams in bore-holes, the combination with a tubular boring rod adapted to conduct flushing water, means for supplying water to said rod, an outer casing containing an inner waterproof casing, said inner waterproof casing containing a suitably mounted magnet needle, a pin passing from the outer casing into the inner casing, a lever mechanism in said inner casing operatively connected with said pin and adapted to fix said needle at any desired time and any desired distance below the ground independently of the time consumed for lowering said boring rod, said lever mechanism and said pin being normally inoperative; of means operated by said flushing water adapted to cause said pin to operate said lever mechanism.

5. In an apparatus for ascertaining the strike or dip of veins or seams in bore holes, the combination with the tubular boring rod or core tube of an outer casing containing an inner waterproof casing, with a suitable space between, said space and said boring tube adapted to contain flushing water, said inner waterproof casing containing a suitably mounted magnet needle, a pin passing from the outer casing into the inner waterproof casing, a lever mechanism operated by said pin and adapted to fix said needle at any desired time and any desired distance below the ground and being normally inoperative to fix the needle and means operated by said flushing water, said means adapted to push said lever operated pin into said waterproof casing.

6. In an apparatus for ascertaining the strike or dip of veins or seams in bore holes, the combination with the tubular boring rod or core tube, of an outer casing containing an inner waterproof casing with a suitable space between, said space and said boring tube adapted to contain flushing water, said inner waterproof casing containing a suitably mounted magnet needle, a pin passing from the outer casing into the inner waterproof casing, and a lever mechanism operated by said pin and adapted to fix said needle at any desired time and any desired distance below the ground, and being normally inoperative to fix the needle, and a suitably shaped body adapted to be placed at any desired time into said boring rod, and capable by means of said flushing water through said boring rod of pushing said pin into the inner waterproof casing against the said needle fixing lever mechanism.

7. In an apparatus for ascertaining the strike or dip of veins or seams in bore holes, the combination with the tubular boring rod or core tube, of an outer casing containing an inner waterproof casing with a suitable space between, said space and said boring tube adapted to contain flushing water, said inner waterproof casing containing a suitably mounted magnet needle, a pin passing from the outer casing into the inner waterproof casing, and a lever mechanism operated by said pin and adapted to fix said needle at any desired time and any desired distance below the ground, and being normally inoperative to fix the needle, and a ball adapted to be placed at any desired time into said boring rod, and capable by means of said flushing water through said boring rod of pushing said pin into the inner waterproof casing against the said needle fixing lever mechanism.

In testimony whereof I have hereunto set my hand in presence of two subscribing witnesses.

FRANZ MEINE.

Witnesses:
HENRY HASPER,
WOLDEMAR HAUPT.